US007403784B2

(12) United States Patent
Ju et al.

(10) Patent No.: US 7,403,784 B2
(45) Date of Patent: Jul. 22, 2008

(54) METHOD AND APPARATUS FOR POSITIONING A SET OF TERMINALS IN AN INDOOR WIRELESS ENVIRONMENT

(75) Inventors: Wen-Hua Ju, Monmouth Junction, NJ (US); Anjur S. Krishnakumar, Rocky Hill, NJ (US); P. Krishnan, Basking Ridge, NJ (US); David Madigan, Chatham, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 201 days.

(21) Appl. No.: 11/077,171

(22) Filed: Mar. 10, 2005

(65) Prior Publication Data

US 2006/0205417 A1 Sep. 14, 2006

(51) Int. Cl.
*H04Q 7/20* (2006.01)
(52) U.S. Cl. ............... 455/456.2; 455/456.1; 455/456.5; 342/450
(58) Field of Classification Search ...... 455/456.1–457, 455/404.2, 67.11, 115.3, 440, 422.1; 370/331, 370/328, 338; 342/450–451, 357.09, 357.08, 342/357.07, 456; 701/214, 201, 207
See application file for complete search history.

(56) References Cited

U.S. PATENT DOCUMENTS

| 5,491,644 | A  | * | 2/1996  | Pickering et al. ............ 455/524 |
| 6,263,208 | B1 |   | 7/2001  | Chang et al. |
| 6,564,065 | B1 |   | 5/2003  | Chang et al. |
| 6,785,254 | B2 | * | 8/2004  | Korus et al. ................. 370/338 |
| 6,839,027 | B2 |   | 1/2005  | Krumm et al. |
| 6,889,053 | B1 |   | 5/2005  | Chang et al. |
| 6,992,625 | B1 | * | 1/2006  | Krumm et al. .............. 342/451 |
| 7,053,830 | B2 | * | 5/2006  | Krumm et al. .............. 342/451 |
| 7,116,988 | B2 | * | 10/2006 | Dietrich et al. ........... 455/456.1 |
| 7,149,196 | B1 | * | 12/2006 | Bims ..................... 455/456.1 |
| 7,196,662 | B2 | * | 3/2007  | Misikangas et al. ......... 342/451 |
| 7,202,816 | B2 | * | 4/2007  | Krumm et al. .............. 342/451 |
| 7,250,907 | B2 | * | 7/2007  | Krumm et al. .............. 342/451 |
| 2003/0043073 | A1 |  | 3/2003  | Gray et al. |
| 2004/0003042 | A1 | * | 1/2004  | Horvitz et al. .............. 709/204 |
| 2004/0072577 | A1 | * | 4/2004  | Myllymaki et al. ...... 455/456.1 |
| 2004/0263388 | A1 | * | 12/2004 | Krumm et al. .............. 342/451 |
| 2005/0020277 | A1 | * | 1/2005  | Krumm et al. ........... 455/456.1 |
| 2005/0030929 | A1 | * | 2/2005  | Swier et al. ................. 370/338 |
| 2005/0125369 | A1 | * | 6/2005  | Buck et al. .................... 706/12 |

(Continued)

FOREIGN PATENT DOCUMENTS

EP 1 500 949 A1 1/2005

(Continued)

*Primary Examiner*—William Trost
*Assistant Examiner*—Kamran Afshar
(74) *Attorney, Agent, or Firm*—Ryan, Mason & Lewis, LLP

(57) ABSTRACT

Methods and apparatus are provided for estimating a location of a plurality of wireless terminals. Signal strength measurements are obtained for at least one packet transmitted by each of the wireless terminals; and a Bayesian algorithm is applied to the signal strength measurements to estimate the location of each wireless terminal. In an infrastructure-based deployment, signal strength measurements are obtained from one or more signal monitors. In a client-based model, signal strength measurements are obtained from a client associated with a respective wireless terminal.

36 Claims, 7 Drawing Sheets

U.S. PATENT DOCUMENTS

| | | | |
|---|---|---|---|
| 2005/0136972 A1* | 6/2005 | Smith et al. | 455/554.1 |
| 2005/0243936 A1* | 11/2005 | Agrawala et al. | 375/259 |
| 2005/0251328 A1* | 11/2005 | Merwe et al. | 701/200 |
| 2006/0041615 A1* | 2/2006 | Blank et al. | 709/204 |
| 2006/0119516 A1* | 6/2006 | Krumm et al. | 342/451 |

FOREIGN PATENT DOCUMENTS

| | | |
|---|---|---|
| WO | WO 2004/008795 A1 | 1/2004 |
| WO | WO 2004/095868 A3 | 11/2004 |

* cited by examiner

100

200

METHOD AND APPARATUS FOR POSITIONING A SET OF TERMINALS IN AN INDOOR WIRELESS ENVIRONMENT

FIELD OF THE INVENTION

The present invention relates generally to communication methods and systems, and more particularly, to methods and systems that estimate the location of terminals in a wireless network environment.

BACKGROUND OF THE INVENTION

The growth of wireless networking has generated commercial and research interest in statistical methods to track people and things. Inside stores, hospitals, warehouses, and factories, where Global Positioning System devices generally do not work, Indoor Positioning Systems (IPS) aim to provide location estimates for wireless devices such as laptop computers, handheld devices, and electronic badges. The proliferation of "Wi-Fi" (IEEE 802.11b) wireless internet access in cafes, college campuses, airports, hotels, and homes has generated particular interest in indoor positioning systems that utilize physical attributes of Wi-Fi signals. Typical applications include tracking equipment and personnel in hospitals, providing location-specific information in supermarkets, museums, and libraries, and location-based access control.

In a standard Wi-Fi implementation, one or more access points serve end-users. Wi-Fi location estimation can employ one or more of several physical attributes of the medium, such as received signal strength (RSS) from the access points, the angle of arrival of the signal, and the time difference of arrival. A number of techniques have been proposed or suggested that use RSS for location estimation in wireless networks. See, for example, P. Bahl et al., "RADAR: An In-Building RF-Based User Location and Tracking System," Proc. of IEEE Infocom 2000, Tel Aviv, Israel (March, 2000); or T. Roos et al., "A Statistical Modeling Approach to Location Estimation," IEEE Transactions on Mobile Computing, 1, 59-69 (2002).

In a laboratory setting, RSS decays linearly with log distance and a simple triangulation using RSS from three access points can uniquely identify a location in a two-dimensional space. In practice, however, physical characteristics of a building, such as walls, elevators, and furniture, as well as human activity, add significant noise to RSS measurements. Consequently, statistical approaches to location estimation prevail.

Supervised learning techniques are typically employed in statistical approaches to location estimation. The training data comprise vectors of signal strengths, one for each of a collection of known locations. The dimension of each vector equals the number of access points. The corresponding location could be one-dimensional (e.g., location on a long airport corridor), two-dimensional (e.g., location on one floor of a museum), or three-dimensional (e.g., location within a multi-story office building).

Two types of location estimation systems exist. In a client-based deployment, the client measures the signal strengths as seen by it from various access points. The client uses this information to locate itself. The cost to an enterprise for such deployments is the cost of profiling the site, building the model, and maintaining the model. In an infrastructure-based deployment, the administrator deploys so-called sniffing devices that monitor the signal strength from clients. U.S. patent application Ser. No. 10/776,058, filed Feb. 11, 2004 and entitled "Estimating the Location of Inexpensive Wireless Terminals by Using Signal Strength Measurements," incorporated by reference herein, discloses a system for estimating the location of wireless terminals using such sniffing devices. U.S. patent application Ser. No. 10/776,588, filed Feb. 11, 2004 and entitled "Estimating the Location of Wireless Terminals In A Multistory Environment," incorporated by reference herein, discloses a system for estimating the location of wireless terminals on multiple floors.

The cost to enterprises in such deployments is the typically modest cost of deploying the necessary hardware and software, and the time and effort to build and maintain the model (if it is not completely automated). Collecting the location data is labor intensive, requiring physical distance measurements with respect to a reference object, such as a wall. Furthermore, even in normal office environments, changing environmental, building, and occupancy conditions can affect signal propagation and require repeated data gathering to maintain predictive accuracy. The model building phase then learns a predictive model that maps signal strength vectors to locations. A number of supervised learning methods have been applied to this problem, including nearest neighbor methods, support vector machines, and assorted probabilistic techniques.

A need therefore exists for improved location estimation techniques that can provide accurate location estimates without location information in the training data. A further need therefore exists for location estimation techniques that do not require profiling.

SUMMARY OF THE INVENTION

Generally, methods and apparatus are provided for estimating a location of a plurality of wireless terminals. Signal strength measurements are obtained for at least one packet transmitted by each of the wireless terminals; and a Bayesian algorithm is applied to the signal strength measurements to estimate the location of each wireless terminal. In an infrastructure-based deployment, signal strength measurements are obtained from one or more signal monitors. In a client-based model, signal strength measurements are obtained from a client associated with a respective wireless terminal.

A more complete understanding of the present invention, as well as further features and advantages of the present invention, will be obtained by reference to the following detailed description and drawings.

DETAILED DESCRIPTION

The present invention provides improved location estimation techniques that provide accurate location estimates without location information in the training data and that do not require profiling. A Bayesian hierarchical model is provided for indoor location estimation in wireless networks. The disclosed terminal position system 100 reduces the requirement for training data as compared with conventional techniques. The present invention uses a hierarchical Bayesian framework to incorporate important prior information and the graphical model framework to facilitate the construction of realistically complex models. While the present invention is illustrated herein using an infrastructure-based deployment, where sniffing devices, referred to herein as signal monitors, monitor the signal strength from clients, the present invention may also be implemented using a client-based model, where a client executing on each wireless device provides signal strength data to a location estimation server.

Wireless Network Details

Figure 1:
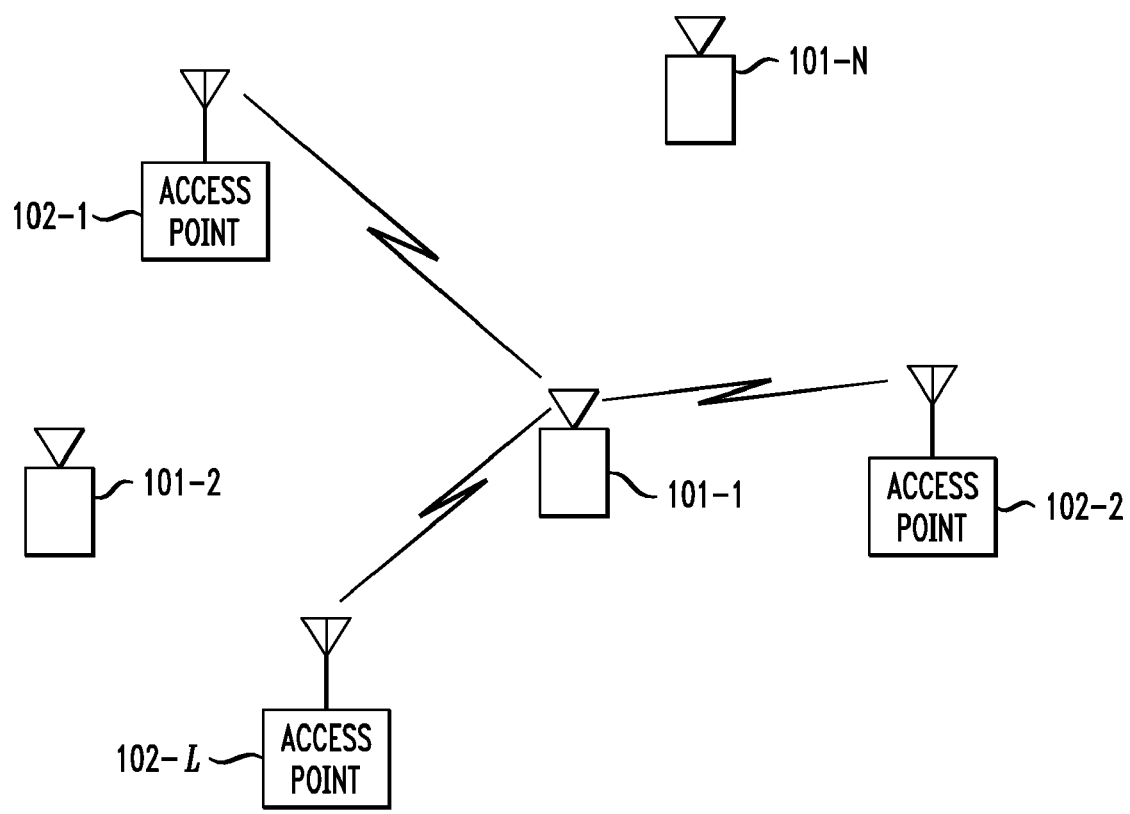
FIG. 1 illustrates a conventional wireless network environment in which the present invention can operate.

FIG. 1 illustrates a conventional wireless network environment 100 in which the present invention can operate. As shown in FIG. 1, the wireless network environment 100 comprises a number of wireless telecommunication terminals 101-1 through 101-N and access points 102-1 through 102-L, interconnected as shown and collectively referred to herein as wireless terminals 101 and access points 102, respectively. For example, exemplary wireless terminal 101-1 may use access points 102-1 through 102-L to exchange blocks of data, or "packets," with computer servers or other devices. At any given time, wireless terminal 101-1 is associated with one of access points 102-1 through 102-L for the purpose of communicating with the other devices.

It is often important to know the location of wireless terminals 101 within wireless network 100. Knowledge of the location of wireless terminals 101 enables services that use end-user location information, such as location-aware content delivery, emergency location, services based on the notion of "closest resource," and location-based access control.

Figure 2:
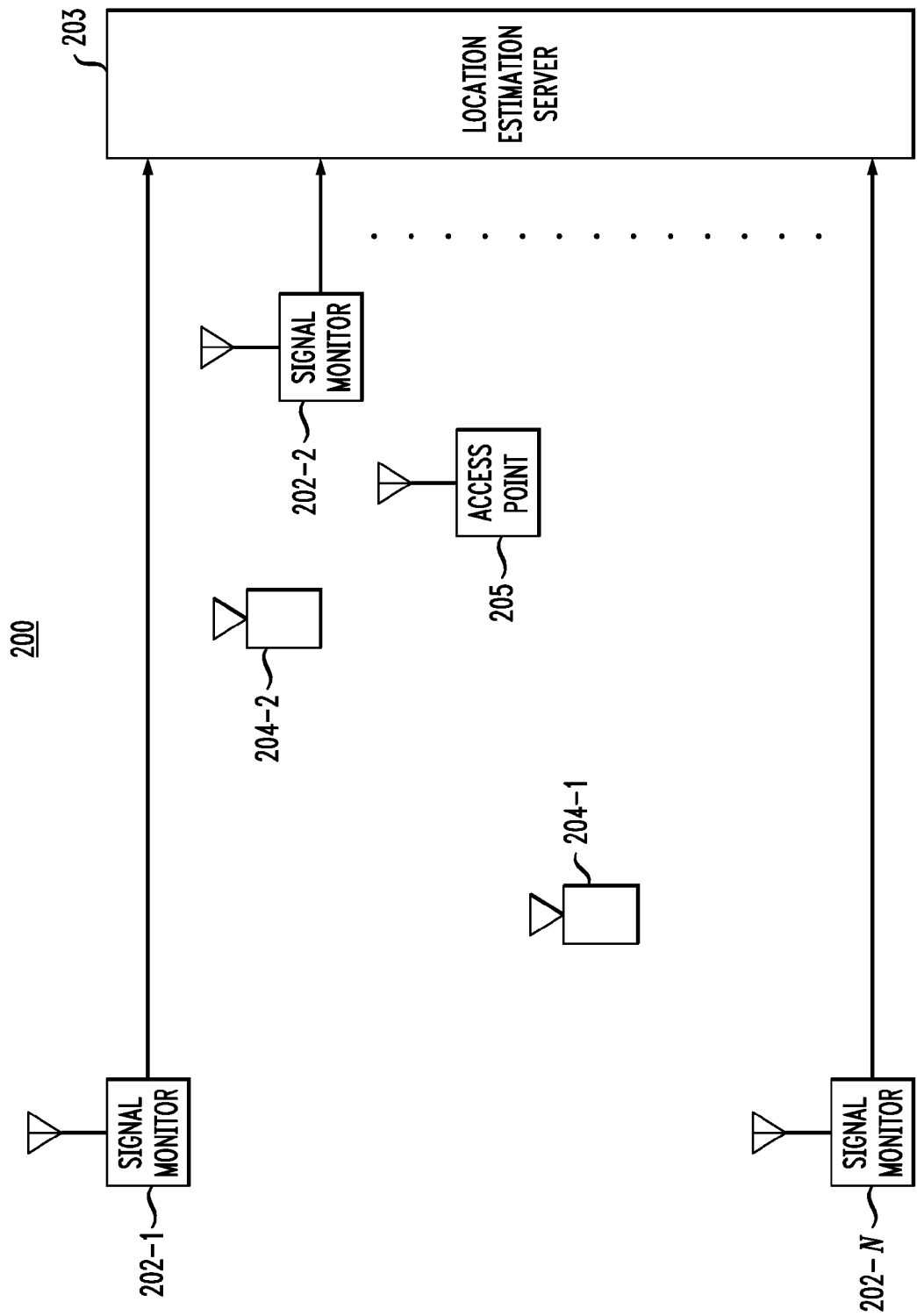
FIG. 2 illustrates a wireless network incorporating features of the present invention

FIG. 2 illustrates a network 200 that incorporates features of the present invention. Network 200 operates in accordance with a set of air interface protocols (e.g., IEEE 802.11, etc.) and comprises signal monitors 202-1 through 202-N, wherein N is a positive integer; location estimation server 203; wireless terminals 204; and access point 205, interconnected as shown.

Signal monitor 202-j, for j=1 to N, measures (i.e., "sniffs") signals that are present on the wireless medium and transmitted by various signal sources, and determines the received signal strength (RSS) of those signals. Signal sources include wireless terminals 101, 204. Signal monitor 202-j sends the signal strength measurements to location estimation server 203. In addition, in some embodiments signal monitor 202-j receives the identifying information transmitted by wireless terminal 204 and sends the information to location estimation server 203. In some embodiments, signal monitor 202-j provides information (e.g., its coordinates, its identifier, etc.) with which to determine its location—either directly or indirectly—to location estimation server 203. The signal monitor 202-j is described below with respect to FIG. 4.

FIG. 2 depicts a wired interface between signal monitors 202-1 through 202-N and location estimation server 203. Signal monitors 202-1 through 202-N, however, can communicate with location estimation server 203 via a wired interface, the wireless medium, or both in well-known fashion.

Location estimation server 203 acquires the received signal strength measurements from signal monitors 202-1 through 202-N. Location estimation server processes the received signal strength measurements corresponding to the wireless terminals 101 in accordance with the present invention. The location estimation server 203 is described below with respect to FIG. 5.

Wireless terminals 204 are capable of transmitting packets of data over a wireless medium in well-known fashion. The packets of data can comprise information that identifies wireless terminal 204. Wireless terminals 204 comprise a transmitter for the purpose of transmitting the packets of data. Wireless terminals 204 can be, for example, a communications station, a locating device, a handheld computer, a laptop with wireless capability or a telephone. It will be clear to those skilled in the art how to make and use wireless terminals 204.

Wireless terminals 204, in some embodiments, exchange packets with access point 205. Signal monitor 202-j can measure these packets for the purpose of estimating location. In other embodiments, wireless terminals 204 transmit packets specifically for the purpose of estimating the location of the wireless terminals 204.

Access point 205, in some embodiments, exchanges packets of data with wireless terminals 204 in well-known fashion. Access point 205 can be used to coordinate communication in network 200 and to provide wireless terminals 204 with access to networks that are external to network 200, in well-known fashion. In other embodiments, access point 205 is not present. It will be clear to those skilled in the art how to make and use access point 205.

In some embodiments, signal monitor 202-j and access point 205 are collocated. In other embodiments, additional signal monitors, or signal monitors not collocated with access point 205 are placed to ensure that signal monitors 202-1 through 202-N are not collinear (or no three signal monitors are collinear) within the x-y coordinate plane mentioned earlier.

While the present invention is illustrated in FIG. 2 using an infrastructure-based deployment, where the signal monitors 202 monitor the signal strength from clients 204, the present invention may also be implemented using a client-based model, where a client executing on each wireless device 204 provides signal strength data to the location estimation server 203. It is noted that in such a client-based model, the signal monitors 202 are not needed. Generally, clients in each wireless device 204 monitor signal strengths from access points 205 and report them to the location estimation server 203. The Bayesian technique disclosed herein is then applied to the collected signal strength data. In one embodiment, each client forwards signal strength measurements with an access point identifier.

Radio Frequency Signal Propagation in Wireless Ethernet

The IEEE 802.11b High-Rate standard uses radio frequencies in the 2.4 GHz band. Wi-Fi adaptors use spread-spectrum technology that spreads the signal over several frequencies. In this way, interference on a single frequency does not entirely block the signal. The signal itself propagates in a complex manner. Reflection, absorption, and diffraction occur when the waves of the signal encounter opaque obstacles resulting in essentially random variations of signal strength. A variety of other factors, such as noise, interference from other sources, and interference between channels, also affect the signal. The resonant frequency of water happens to be 2.4 GHz so people also absorb the radio waves and impact the signal strength. Other common devices using the 2.4 GHz band include microwave ovens, Blue Tooth devices, and 2.4 GHz cordless phones.

Thus, received signal strength varies over time at a single location and varies across different locations. The present invention recognizes, however, that signal profiles corresponding to spatially adjacent locations are similar as the various external variables remain approximately the same over short distances. Furthermore, the local average of the signal strength varies slowly over time and the signal strength decays approximately in proportion to log distance.

Bayesian Graphical Models

As previously indicated, the present invention provides a Bayesian hierarchical models for indoor location estimation in wireless networks. A graphical model is a multivariate statistical model embodying a set of conditional independence relationships. A graph displays the independence relationships. The vertices of the graph correspond to random variables and the edges encode the relationships. To date, most research on graphical models has focused on acyclic digraphs, chordal undirected graphs, and chain graphs that allow both directed and undirected edges, but have no partially directed cycles.

Figure 3:
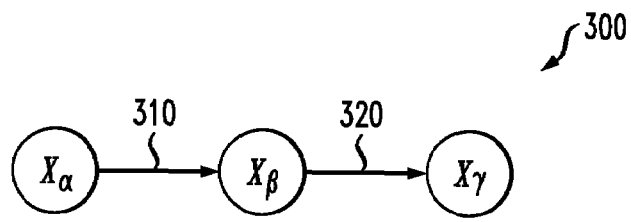
FIG. 3 illustrates an acyclic directed graphical (ADG) model.

The present invention focuses on acyclic digraphs (ADGs) with both continuous and categorical random variables. FIG. 3 illustrates an acyclic directed graphical (ADG) model 300. As shown in FIG. 3, all the edges in an ADG are directed and the graph 300 represents them with arrows 310, 320. A directed graph is acyclic if it contains no cycles. Each vertex in the graph corresponds to a random variable $X_v$, $v \in V$ taking values in a sample space $\aleph_v$. To simplify notation, v is used in place of $X_v$ in the following discussion. In an ADG, the parents of a vertex v, pa(v), are those vertices from which vertices point into v. The descendants of a vertex v are the vertices which are reachable from v along a directed path. A vertex w is a child of v if there is an edge from v to w. The parents of v are taken to be the only direct influences on v, so that v is independent of its non-descendants, given its parents. This property implies a factorization of the joint density of $X_v$, $v \in V$, denoted by p(V), given by:

$$p(V) = \prod_{v \in V} p(v \mid pa(v)) \quad (1)$$

The directed graph 300 of FIG. 3 assumes that $X_\gamma$ and $X_\alpha$ are conditionally independent given $X_\beta$. The joint density of the three variables factors accordingly, $$p(X_\alpha, X_\beta, X_\gamma) = p(X_\alpha) p(X_\beta \mid X_\alpha) p(X_\gamma \mid X_\beta).$$

For graphical models where all the variables are discrete, it has been shown how independent Dirichlet prior distributions can be updated locally to form posterior distributions as data arrive; and corresponding closed-form expressions for complete-data likelihoods and posterior model probabilities, and corresponding Bayesian model averaging procedures have been provided. In the Bayesian framework, model parameters are random variables and appear as vertices in the graph.

When some variables are discrete and others continuous, or when some of the variables are latent or have missing values, a closed-form Bayesian analysis generally does not exist. Analysis then requires either analytic approximations of some kind or simulation methods. The present invention considers a Markov chain Monte Carlo (MCMC) simulation method. For an introduction to a particular MCMC algorithm, the univariate Gibbs sampler, for Bayesian graphical models, see D. J. Spiegelhalter, "Bayesian Graphical Modeling: A Case Study in Monitoring Health Outcomes," Applied Statistics, 47, 115-133 (1988).

Generally, the Gibbs sampler starts with some initial values for each unknown quantity (that is, model parameters, missing values, and latent variables), and then cycles through the graph simulating each variable v in turn from its conditional probability distribution, given all the other quantities, denoted V\v, fixed at their current values (known as the "full conditional"). The simulated v replaces the old value and the simulation shifts to the next quantity. After sufficient iterations of the procedure, it is assumed that the Markov chain has reached its stationary distribution, and then future simulated values for vertices of interest are monitored. Inferences concerning unknown quantities are then based on data analytic summaries of these monitored values, such as empirical medians and 95% intervals. Some delicate issues do arise with the Gibbs sampler, such as assessment of convergence, sampling routines, as described in W. R. Gilks et al., "Markov Chain Monte Carlo in Practice," Chapman and Hall, London (1996).

The crucial connection between directed graphical models and Gibbs sampling lies in expression (1). The full conditional distribution for any vertex v is equal to:

$$p(v \mid V \setminus v) \propto p(v, V \setminus v)$$
$$\propto \text{terms in } p(V) \text{containing } v$$
$$\propto p(v \mid pa(v)) \prod_{w \in child(v)} p(w \mid pa(w)),$$

i.e., a prior term and a set of likelihood terms, one for each child of v. Thus, when sampling from the full conditional for v, only vertices which are parents, children, or parents of children of v need be considered, and local computations can be performed. The BUGS language and software, D. J. Spiegelhalter et al., "WinBUGS Version 1.2 User Manual," MRC Biostatistics Unit (1999), implements a version of the Gibbs sampler for Bayesian graphical models.

Signal Monitor and Location Estimation Server Details

Figure 4:
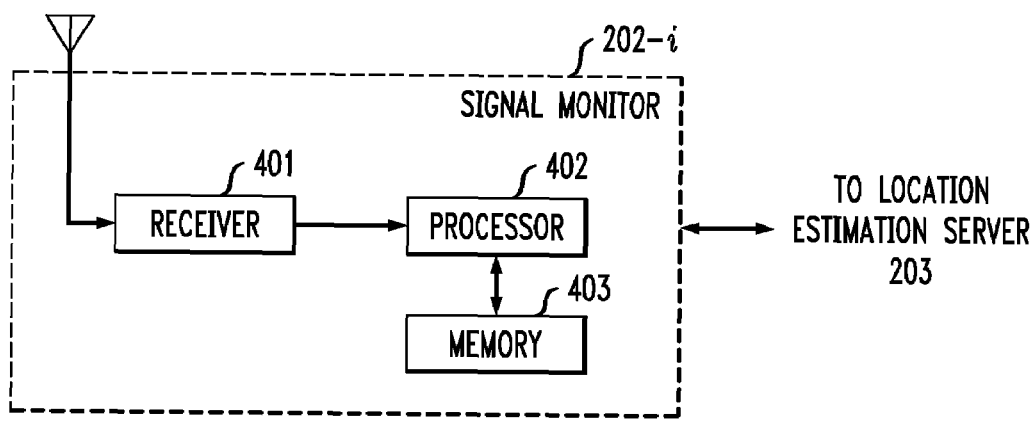
FIG. 4 is a block diagram illustrating the signal monitor of FIG. 2 in further detail.

FIG. 4 is a block diagram illustrating the signal monitor 202-j in accordance with one illustrative embodiment of the present invention. As shown in FIG. 4, signal monitor 202-j comprises receiver 401, processor 402, and memory 403, interconnected as shown. Receiver 401 is a circuit that is capable of receiving packets from the wireless medium, in well-known fashion, and of forwarding them to processor 402.

Processor 402 is a general-purpose processor that is capable of performing the tasks described below and with respect to FIGS. 6 through 8. It will be clear to those skilled in the art, after reading this specification, how to make and use processor 402. Memory 403 is capable of storing programs and data used by processor 402.

Figure 5:
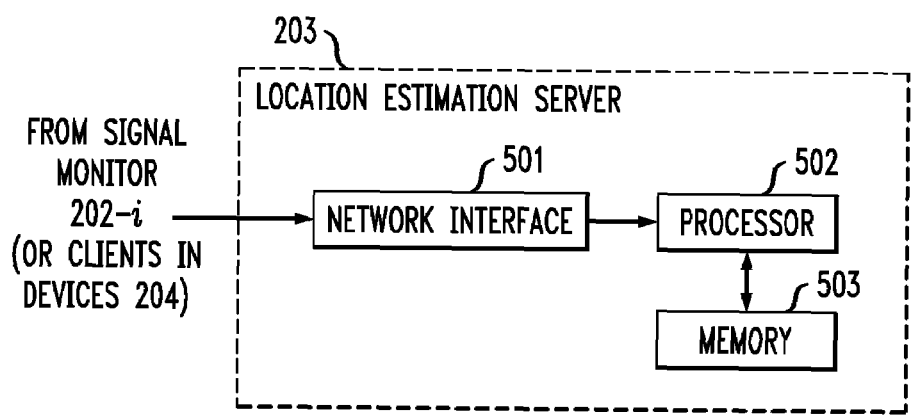
FIG. 5 is a block diagram illustrating the location estimation server of FIG. 2 in further detail.

FIG. 5 is a block diagram illustrating the location estimation server 203 in accordance with one illustrative embodiment of the present invention. Location estimation server 203 comprises network interface 501, processor 502, and memory 503, interconnected as shown.

Network interface 501 is a circuit that is capable of receiving, in well-known fashion, received signal strength measurements and identifier information from one or more of signal monitors 202-1 through 202-N (or from clients in the wireless devices 204 in a client-based model). In some embodiments, network interface 501 receives signal monitor identifier information from one or more of signal monitors 202-1 through 202-N. Network interface 501 is also capable of forwarding the signal strength measurements and identifier information received to processor 502.

Processor 502 may be embodied as a general-purpose processor that is capable of performing the tasks described herein. Memory 503 is capable of storing programs and data used by processor 502.

Location Estimation Using Bayesian Models

Figure 6:
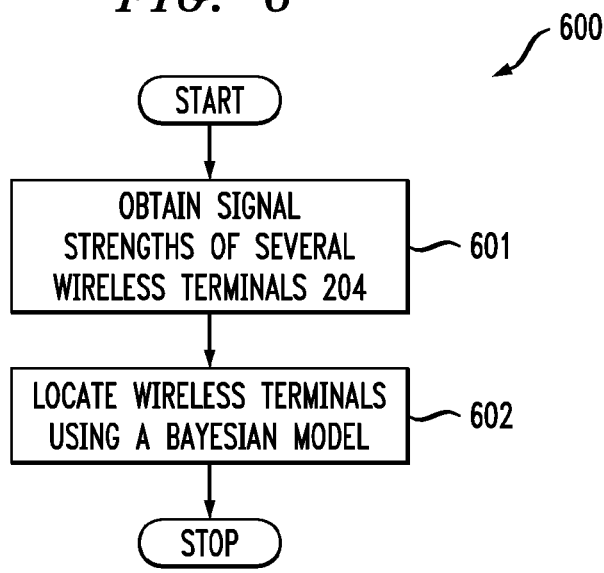
FIG. 6 is a flow chart describing an exemplary implementation of a location estimation process incorporating features of the present invention.

FIG. 6 is a flow chart describing an exemplary implementation of a location estimation process 600 incorporating features of the present invention. Generally, the location estimation process 600 estimates the location of a number of wireless terminals 204 by applying a Bayesian model to signal strength measurements collected from the wireless terminals 204. As shown in FIG. 6, the location estimation process 600 initially obtains, for example, from signal monitors 202-1 through 202-N (or from clients in the wireless devices 204 in a client-based model), the signal strength of at least one packet for a number of wireless terminals 204 during step 601. Thereafter, the location estimation process 600 estimates the location of the wireless terminals 204 during step 602 by applying a Bayesian model to the signal strength measurements.

Figure 7:
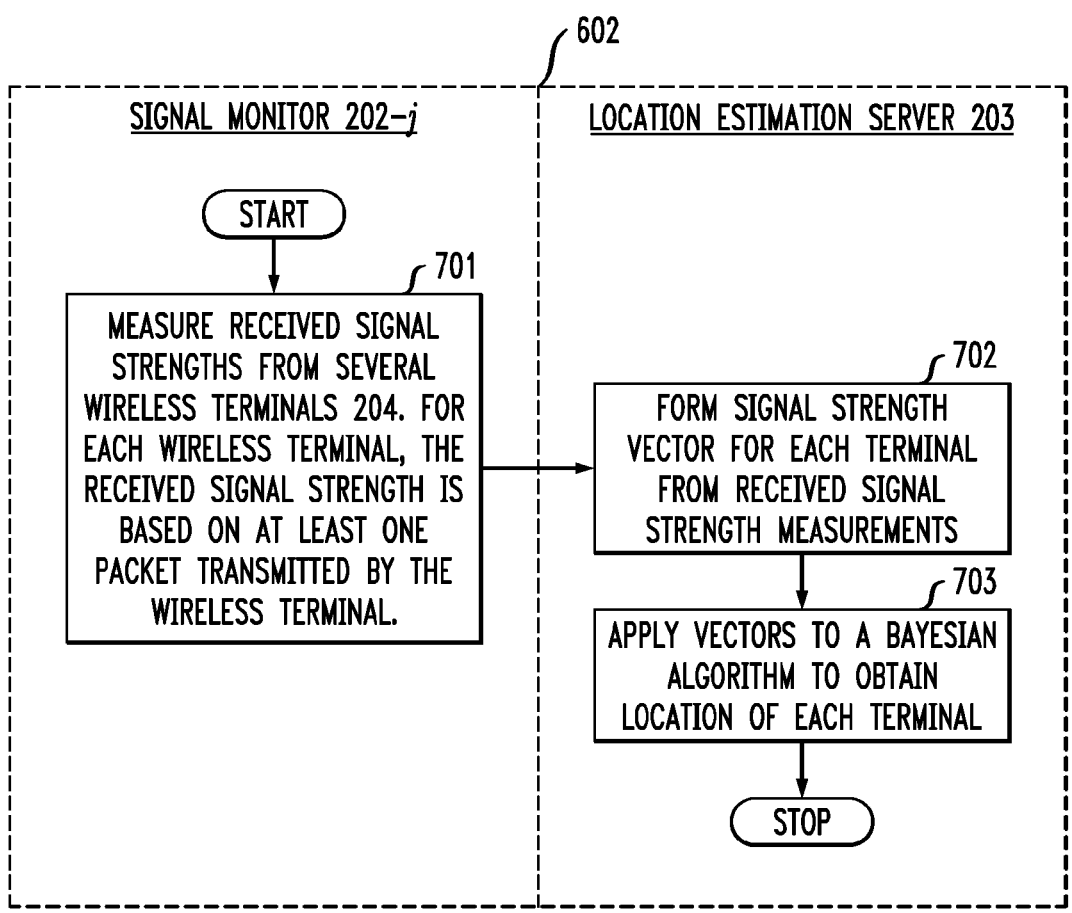
FIG. 7 is a flow chart describing the location estimation process of FIG. 6 in further detail.

FIG. 7 is a flow chart describing the location estimation process 600 of FIG. 6 in further detail. As shown in FIG. 7, the signal monitor 202-f measures the received signal strengths from several wireless devices 204. For each wireless device 204, the received signal strength is based on at least one packet transmitted by the wireless device 204. It is again noted that the signal strengths are obtained from clients in the wireless devices 204 in a client-based model. Note that the location of the wireless terminals are unknown before measuring the signal strength of the packet. Furthermore, no previous information on each wireless terminal is available necessarily to the system of the illustrative embodiment. The signal strength measurement of the packet transmitted by each wireless terminal 204, along with the signal strength measurement of the packet, is used to determine the location of wireless terminals 204.

In some embodiments, the signal strength measurements that represents one or more wireless terminals 204 may be (i) the median of, or (ii) the mean of more than one signal strength measurement made over time on multiple packets transmitted by a respective wireless terminal 204. It will be clear to those skilled in the art how to determine either the median or the mean of more than one signal strength measurement. In some embodiments, a wireless terminal 204 is prompted by another device (e.g., access point 205) to transmit a packet.

The location estimation server 203 receives the signal strength measurements of wireless terminals 204 from at least one of signal monitors 202-1 through 202-N during step 702 and forms signal strength vectors. During step 703, the location estimation server 203 applies the vectors formed in the previous step to a Bayesian algorithm to obtain the location of each terminal, as discussed further below in conjunction with FIGS. 8 through 11.

Exemplary Bayesian Models

The present invention provides a model that embodies extant knowledge about Wi-Fi signals as well as physical constraints implied by the target building. The following discussion presents a series of models of increasing complexity.

Non-Hierarchical Bayesian Graphical Model

Figure 8:
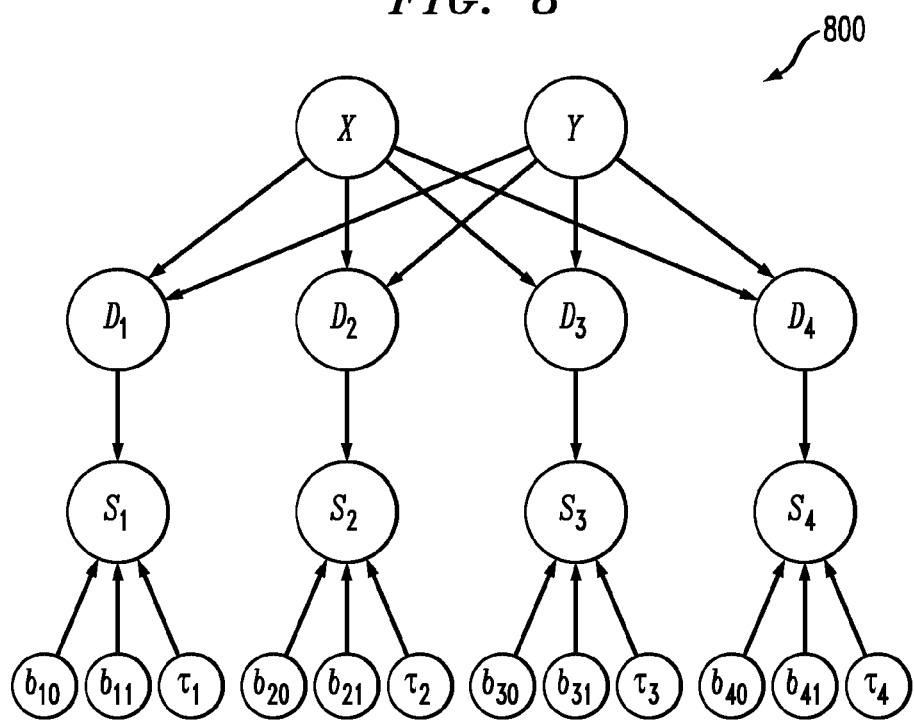
FIG. 8 illustrates a graphical model for a two-dimensional location estimation problem in a building with four exemplary access points.

FIG. 8 illustrates a graphical model 800 for a two-dimensional location estimation problem in a building with four signal monitors. In the following discussion, this model is referred to as $M_1$ (although the number of signal monitors varies).

The vertices X and Y represent location. The vertex $D_i$ represents the Euclidean distance between the location specified by X and Y and the i'th signal monitor (where i=1, ..., 4). Since it is assumed that the locations of the signal monitors are known, the $D_i$'s are deterministic functions of X and Y. The vertex $S_i$ represents the signal strength measured by the signal monitor 202 at (X, Y) with respect to the i'th signal monitor, i=1, ..., 4. The model assumes that X and Y are marginally independent.

Specification of the model requires a conditional density for each vertex given its parents as follows:

$X \sim$ uniform (0, L),
$Y \sim$ uniform (0, B),
$S_i \sim N(b_{i0} + b_{i1} \log D_i, \tau_i)$, i=1,2,3,4,
$b_{i0} \sim N(0, 0.001)$, i=1, 2, 3, 4,
$b_{i1} \sim N(0, 0.001)$, i=1, 2, 3, 4.

Here, L and B denote the length and breadth of the building, respectively. The distributions for X and Y reflect the physical constraints of the building. The model for $S_i$ reflects the fact that signal strength decays approximately linearly with log distance. Note that $N(\mu, \tau)$ is used to denote a Gaussian distribution with mean $\mu$ and precision $\tau$ so that the prior distributions for $b_{i0}$ and $b_{i1}$ have large variance.

Figure 9:
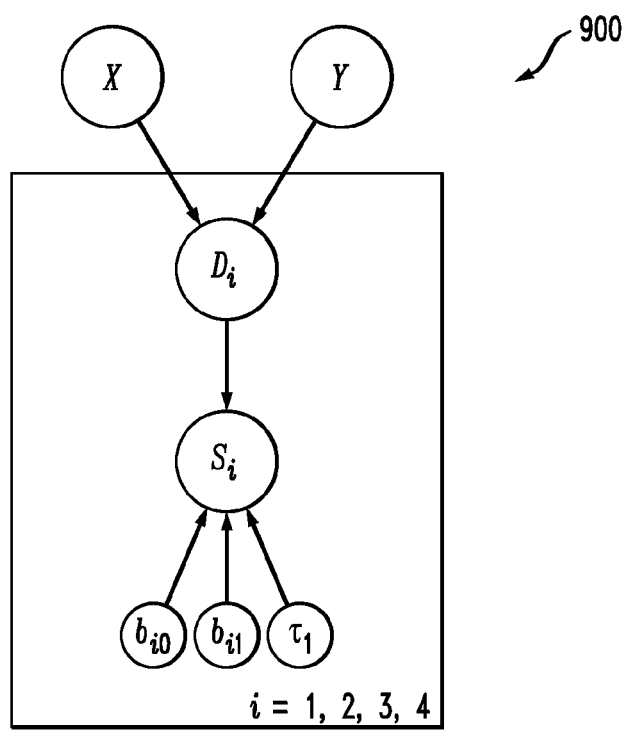
FIG. 9 illustrates a Bayesian graphical model ($M_1$) of FIG. 9 using plate notation.

FIG. 9 illustrates a Bayesian graphical model ($M_1$) 900 using plate notation. In particular, the Bayesian graphical model 900 employs a compact representation for $M_1$ using the BUGS plate notation for replicated sub-models and with d denoting the number of signal monitors.

In one exemplary implementation, Markov chain Monte Carlo algorithms estimate the parameters of the Bayesian model and produce location estimates. For real-time or for larger-scale applications variational approximations (such as those described in T. Jaakola and M. I. Jordan, "Bayesian Parameter Estimation via Variational Methods," Statistics and Computing, 10, 25-37 (2000)) may be employed.

Hierarchical Bayesian Graphical Model

The present invention recognizes that the coefficients of the linear regression models corresponding to each of the signal monitors should be similar since the similar physical processes are in play at each signal monitor. Physical differences between locations of the different signal monitors will tend to mitigate the similarity but, nonetheless, borrowing strength across the different regression models might provide some predictive benefits.

Figure 10:
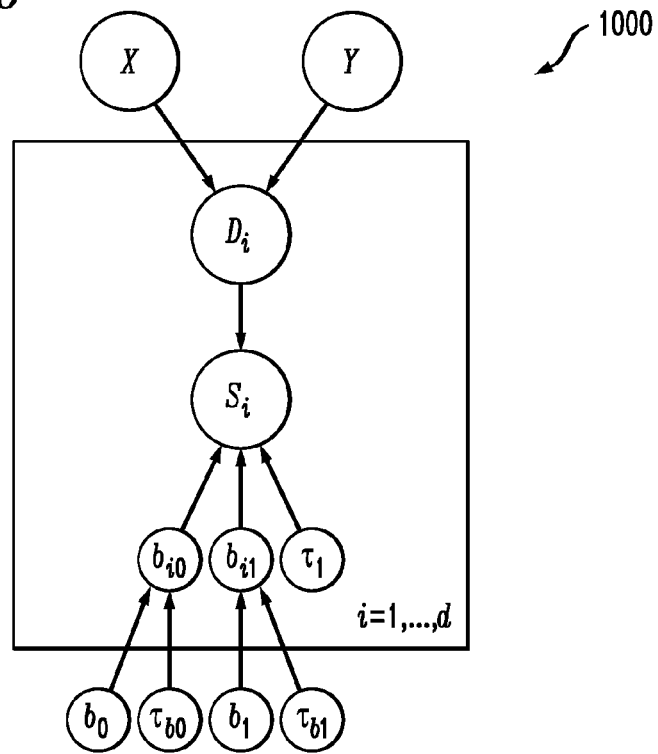
FIG. 10 illustrates a Bayesian hierarchical graphical model ($M_2$) using plate notation.

FIG. 10 illustrates a Bayesian hierarchical graphical model ($M_2$) 1000 using plate notation. The conditional densities for the model 1000 are:

$X \sim$ uniform $(0, L)$,
$Y \sim$ uniform $(0, B)$,
$S_i \sim N(b_{i0} + b_{i1} \log D_i, \tau_i i)$, $i=1, \ldots, d$
$b_{i0} \sim N(b_0, \tau_{b_0})$, $i=1, \ldots, d$,
$b_{i1} \sim N(b_1, \tau_{b_1})$, $i=1, \ldots 1, d$,
$b_0 \sim N(0, 0.001)$,
$b_1 \sim N(0, 0.001)$,
$\tau_{b_0} \sim$ Gamma$(0.001, 0.001)$,
$\tau_{b_1} \sim$ Gamma $(0.001, 0.001)$.

It can be shown that the hierarchical model performs similarly to its non-hierarchical counterpart, although $M_2$ does provide improvement in average error for the smallest training sample size.

Training Data With No Location Information

Model $M_2$ incorporates two sources of prior knowledge. First, $M_2$ embodies the knowledge that signal strength decays approximately linearly with log distance. Second, the hierarchical portion of $M_2$ reflects prior knowledge that the different signal monitors behave similarly. The present invention recognizes that this prior knowledge provides sufficient constraints to obviate the need to know the actual locations of the training data observations. Specifically, the training data now comprise vectors of signal strengths with unknown locations; X and Y in $M_1$ and $M_2$ become latent variables.

Removal of the location data requirement affords significant practical benefits. As discussed above, the location measurement process is slow and human-intensive. By contrast, gathering signal strengths vectors without the corresponding locations does not require human intervention; in the infrastructure approach, suitably instrumented access points or sniffing devices can solicit signal strength measurements from existing Wi-Fi devices and can do this repeatedly at essentially no cost. It is noted that the existing location estimation algorithms require location information in the training data to produce any estimates.

Incorporating Corridor Effects and Other Prior Knowledge

The disclosed graphical modeling framework coupled with MCMC provides a very flexible tool for multivariate modeling.

A. Corridor Model

It has been observed that when an signal monitor is located in a corridor, the signal strength tends to be substantially stronger along the entire corridor. In many office building floors, corridors are mostly parallel to the walls. Hence, a location that shares either an x-coordinate or a y-coordinate with a signal monitor (at least approximately) tends to be in the same corridor as that signal monitor.

Figure 11:
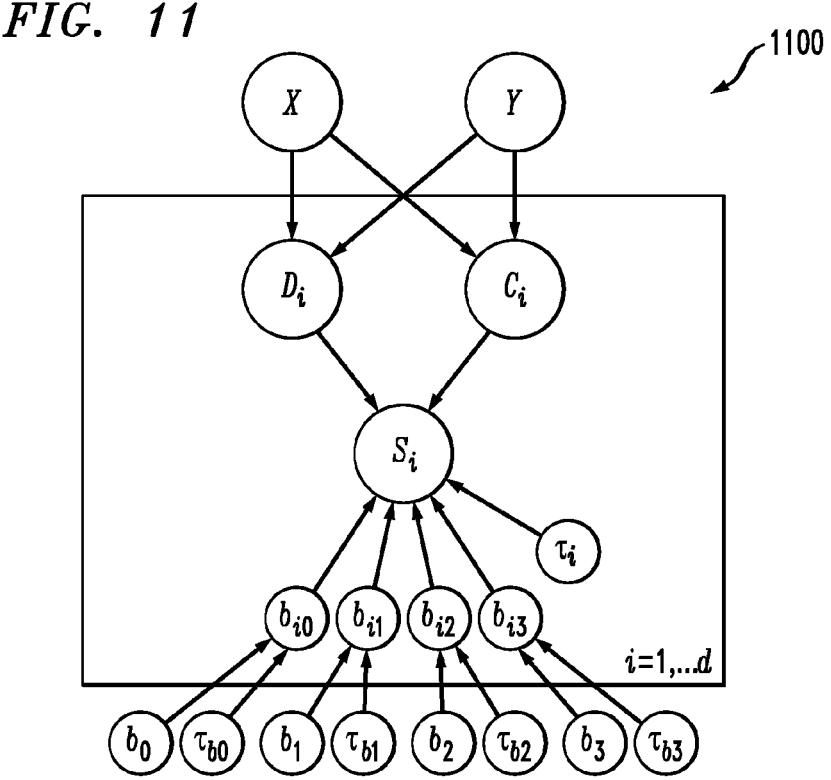
FIG. 11 illustrates a model ($M_3$) that extends the model $M_2$ of FIG. 10 to include a corridor main effect, $C_i$.

FIG. 11 illustrates a model ($M_3$) 1100 that extends the model $M_2$ of FIG. 10 to include a corridor main effect, $C_i$. The variable $C_i$ takes the value 1 if the location (X, Y) shares a corridor with signal monitor i and 0 otherwise. The term "sharing a corridor" is defined as having an x- or y-coordinate within, for example, three feet of the corresponding signal monitor coordinate. Since corridor width varies from building to building, this definition should vary accordingly, as would be apparent to a person of ordinary skill in the art.

The conditional densities for model $M_3$ are:
$X \sim$ uniform $(0, L)$,
$Y \sim$ uniform $(0, B)$,
$S_i \sim N(b_{i0} + b_{i1} \log D_i + b_{i2} C_i + b_{i3} C_i D_i, \tau_i)$, $i=1, \ldots, d$,
$b_{ij} \sim N(b_j, \tau_{b_j})$, $i=1, \ldots, d$, $j=0,1,2,3$,
$b_j \sim N(0, 0.001)$, $j=0,1,2,3$,
$\tau_{b_j} \sim$ Gamma$(0.001, 0.001)$, $j=0,1,2,3$.

It is noted that a corridor main effect and a corridor-distance interaction term are included. Such corridor effects can be extended to include more detailed information concerning wall locations as well as locations of potentially interfering objects, such as elevators, kitchens, or printers.

B. Informative Priors for the Regression Co-Efficients

According to another aspect of the invention, mildly informative prior distributions for the regression coefficients are incorporated in the model. Specifically, in one exemplary implementation, a $N(10, 0.1)$ prior was used for $b_0$ and a $N(-19.5, 0.1)$ prior was used for $b_1$ in Model $M_2$. The means of these priors correspond to the average intercept and slope from a maximum likelihood analysis of the combined data over all signal monitors from a number of exemplary locations. The precisions of 0.1 permit considerable posterior variability around these values.

System and Article of Manufacture Details

Figure 12:
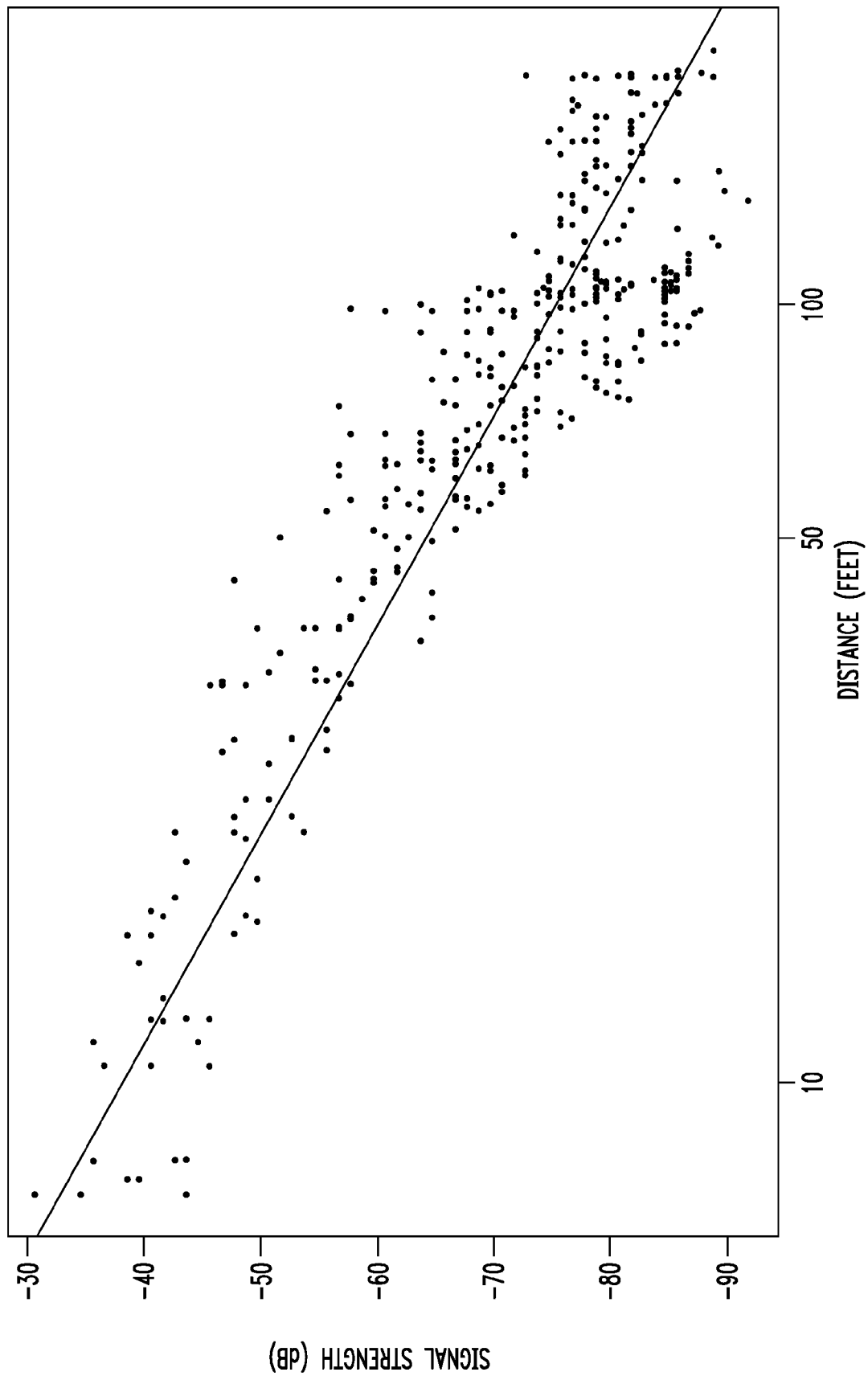
FIG. 12 is conventional graph illustrating the attenuation of received signal Strength (dB) versus distance (feet).

FIG. 12 is a conventional graph illustrating the attenuation of received signal Strength (dB) versus distance (feet).

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

The present invention recognizes that the current model can be generalized in a number of ways. For example, piecewise linear or spline-based models can be employed for the core signal strength-log distance relationship, as the data exhibits some evidence of non-linearity, especially at shorter distances. In addition, models that can incorporate approximate location information can be employed. For example, when sensors are attached to wireline telephones, the room location may be available but not the location of the sensor within the room. Further, models that can incorporate angle-of-arrival information for the signals can also be employed.

We claim:

1. A method for estimating a location of a plurality of wireless terminals, comprising:
    obtaining signal strength measurements associated with a plurality of wireless terminals; and
    applying a Bayesian graphical model to said signal strength measurements to estimate said location of said plurality of wireless terminals, wherein said step of applying said Bayesian graphical model further comprises a step of processing one or more prior probability distributions to generate posterior distributions and wherein said one or more prior probability distributions and said posterior distributions are associated with a relationship of said signal strength measurements and said location of said plurality of wireless terminals, wherein said Bayesian graphical model implements a non-hierarchical Bayesian model.

2. The method of claim 1, wherein said signal strength measurements are obtained from one or more signal monitors that use measurements from at least one packet transmitted by each of said plurality of wireless terminals.

3. The method of claim 1, wherein said signal strength measurements are obtained from a client associated with a respective wireless terminal, said client using measurements from at least one packet transmitted by an access point.

4. The method of claim 1, further comprising the step of forming one or more vectors of signal strength measurements that are applied to said Bayesian graphical model.

5. The method of claim 1, wherein said Bayesian graphical model implements a hierarchical Bayesian model.

6. The method of claim 1, wherein said Bayesian graphical model implements a Bayesian model that decays said signal strength measurements approximately linearly with log distance.

7. The method of claim 1, wherein said Bayesian graphical model implements a Bayesian model that employs similar coefficients of linear regression models corresponding to a plurality of access points.

8. The method of claim 1, wherein said Bayesian graphical model implements a Bayesian model that employs prior knowledge that a plurality of access points behave in a similar manner.

9. The method of claim 1, wherein said Bayesian graphical model implements a Bayesian model that employs a corridor main effect that indicates whether one or more of said wireless terminals are in a same corridor as an access point.

10. The method of claim 1, wherein said Bayesian graphical model implements a Markov chain Monte Carlo algorithm.

11. An apparatus for estimating a location of a plurality of wireless terminals, comprising:
    a memory; and
    at least one processor, coupled to the memory, operative to:
    obtain signal strength measurements associated with a plurality of wireless terminals; and
    apply a Bayesian graphical model to said signal strength measurements to estimate said location of said plurality of wireless terminals, wherein said Bayesian graphical model is applied by processing one or more prior probability distributions to generate posterior distributions and wherein said one or more prior probability distributions and said posterior distributions are associated with a relationship of said signal strength measurements and said location of said plurality of wireless terminals, wherein said Bayesian graphical model implements a non-hierarchical Bayesian model.

12. The apparatus of claim 11, wherein said signal strength measurements are obtained from one or more signal monitors that use measurements from at least one packet transmitted by each of said plurality of wireless terminals.

13. The apparatus of claim 11, wherein said signal strength measurements are obtained from a client associated with a respective wireless terminal, said client using measurements from at least one packet transmitted by an access point.

14. The apparatus of claim 11, wherein said Bayesian graphical model implements a Bayesian model that decays said signal strength measurements approximately linearly with log distance.

15. The apparatus of claim 11, wherein said Bayesian graphical model implements a Bayesian model that employs similar coefficients of linear regression models corresponding to a plurality of access points.

16. The apparatus of claim 11, wherein said Bayesian graphical model implements a Bayesian model that employs prior knowledge that a plurality of access points behave in a similar manner.

17. The apparatus of claim 11, wherein said Bayesian graphical model implements a Bayesian model that employs a corridor main effect that indicates whether one or more of said wireless terminals are in a same corridor as an access point.

18. The apparatus of claim 11, wherein said Bayesian graphical model implements a Markov chain Monte Carlo algorithm.

19. A method for estimating a location of a plurality of wireless terminals, comprising:
    obtaining signal strength measurements associated with a plurality of wireless terminals; and
    applying a Bayesian graphical model to said signal strength measurements to estimate said location of said plurality of wireless terminals, wherein said step of applying said Bayesian graphical model further comprises a step of processing one or more prior probability distributions to generate posterior distributions and wherein said one or more prior probability distributions and said posterior distributions are associated with a relationship of said signal strength measurements and said location of said plurality of wireless terminals, wherein said Bayesian graphical model implements a hierarchical Bayesian model.

20. The method of claim 19, wherein said signal strength measurements are obtained from one or more signal monitors that use measurements from at least one packet transmitted by each of said plurality of wireless terminals.

21. The method of claim 19, wherein said signal strength measurements are obtained from a client associated with a respective wireless terminal, said client using measurements from at least one packet transmitted by an access point.

22. The method of claim 19, further comprising the step of forming one or more vectors of signal strength measurements that are applied to said Bayesian graphical model.

23. The method of claim 19, wherein said Bayesian graphical model implements a non-hierarchical Bayesian model.

24. The method of claim 19, wherein said Bayesian graphical model implements a Bayesian model that decays said signal strength measurements approximately linearly with log distance.

25. The method of claim 19, wherein said Bayesian graphical model implements a Bayesian model that employs similar coefficients of linear regression models corresponding to a plurality of access points.

26. The method of claim 19, wherein said Bayesian graphical model implements a Bayesian model that employs prior knowledge that a plurality of access points behave in a similar manner.

27. The method of claim 19, wherein said Bayesian graphical model implements a Bayesian model that employs a corridor main effect that indicates whether one or more of said wireless terminals are in a same corridor as an access point.

28. The method of claim 19, wherein said Bayesian graphical model implements a Markov chain Monte Carlo algorithm.

29. An apparatus for estimating a location of a plurality of wireless terminals, comprising:
a memory; and
at least one processor, coupled to the memory, operative to:
obtain signal strength measurements associated with a plurality of wireless terminals; and
apply a Bayesian graphical model to said signal strength measurements to estimate said location of said plurality of wireless terminals, wherein said Bayesian graphical model is applied by processing one or more prior probability distributions to generate posterior distributions and wherein said one or more prior probability distributions and said posterior distributions are associated with a relationship of said signal strength measurements and said location of said plurality of wireless terminals, wherein said Bayesian graphical model implements a hierarchical Bayesian model.

30. The apparatus of claim 29, wherein said signal strength measurements are obtained from one or more signal monitors that use measurements from at least one packet transmitted by each of said plurality of wireless terminals.

31. The apparatus of claim 29, wherein said signal strength measurements are obtained from a client associated with a respective wireless terminal, said client using measurements from at least one packet transmitted by an access point.

32. The apparatus of claim 29, wherein said Bayesian graphical model implements a Bayesian model that decays said signal strength measurements approximately linearly with log distance.

33. The apparatus of claim 29, wherein said Bayesian graphical model implements a Bayesian model that employs similar coefficients of linear regression models corresponding to a plurality of access points.

34. The apparatus of claim 29, wherein said Bayesian graphical model implements a Bayesian model that employs prior knowledge that a plurality of access points behave in a similar manner.

35. The apparatus of claim 29, wherein said Bayesian graphical model implements a Bayesian model that employs a corridor main effect that indicates whether one or more of said wireless terminals are in a same corridor as an access point.

36. The apparatus of claim 29, wherein said Bayesian graphical model implements a Markov chain Monte Carlo algorithm.

* * * * *

UNITED STATES PATENT AND TRADEMARK OFFICE
CERTIFICATE OF CORRECTION

PATENT NO. : 7,403,784 B2  
APPLICATION NO. : 11/077171  
DATED : July 22, 2008  
INVENTOR(S) : Ju et al.

Page 1 of 1

It is certified that error appears in the above-identified patent and that said Letters Patent is hereby corrected as shown below:

In the specification, column 3, line 7, after "FIG. 12 is" and before "conventional" insert --a--.

Column 9, line 9, after "$\tau_i$" and before ")" delete "i"; line 11, after "i=1," replace "...1,d," with --...,d,--.

Column 10, lines 19-21, the sentence "FIG. 12 is a conventional graph illustrating the attenuation of received signal Strength (dB) versus distance (feet)" should precede the section header "System and Article of Manufacture Details". Consequently, please, swap them around.

Signed and Sealed this

Twenty-seventh Day of January, 2009

JOHN DOLL  
*Acting Director of the United States Patent and Trademark Office*